Jan. 3, 1933.                S. S. MATTHES                1,893,373
                              TROLLEY HARP
                            Filed June 28, 1930

Samuel S. Matthes, Inventor

By _____ Attorney

Patented Jan. 3, 1933

1,893,373

UNITED STATES PATENT OFFICE

SAMUEL S. MATTHES, OF MANSFIELD, OHIO, ASSIGNOR TO THE OHIO BRASS COMPANY, OF MANSFIELD, OHIO, A CORPORATION OF NEW JERSEY

TROLLEY HARP

Application filed June 28, 1930. Serial No. 464,529.

My invention relates to trolley heads for use primarily on trolley busses which are electrically operated and are free to move from side to side of the highway and derive current from overhead trolley conductors which are fixed with relation to the highway.

The object of my invention is to provide a device which will permit the movement of the bus from side to side of the highway and permit the current collector in contact with the trolley wire to move freely and relatively to its support, but remain in fixed relation to the trolley wire.

A further object of my invention is to provide a device in which the relative movement of the current collector with respect to its main support meets with as little resistance as possible in order to minimize the wear upon the wire and collector as much as possible.

Another object of my invention is to insulate electrically the current collector and its support from the trolley pole to which it is attached and to prevent sound vibration from being transmitted from the collector to the pole and thence to the roof of the bus where it is greatly amplified to the discomfort of the passengers.

My invention resides in the new and novel construction, combination and relation of the various parts described in my specification and shown in the drawing accompanying the same.

In the drawing:—

Figure 1:
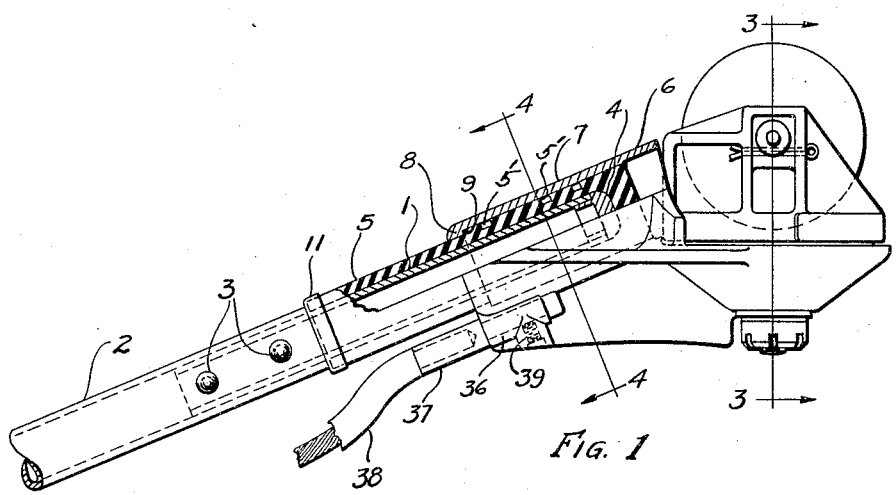
Fig. 1 is a side view of my invention in partial section attached to a pole.
Figure 2:
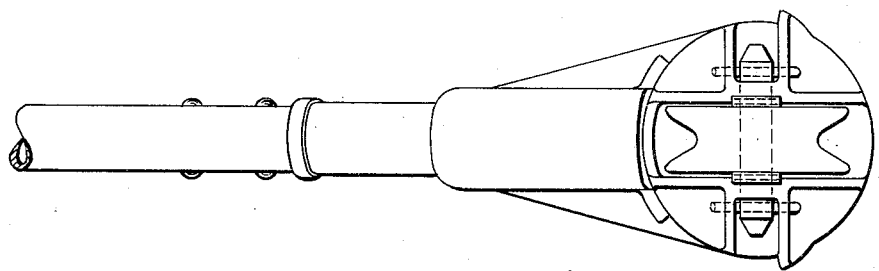
Fig. 2 is a top view of Fig. 1.
Figure 3:
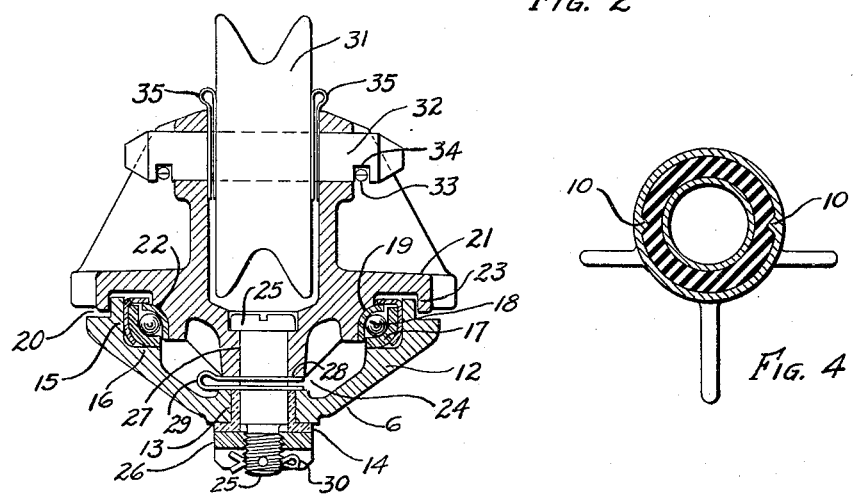
Fig. 3 is a partial section on the line 3—3 of Fig. 1.
Figure 4:
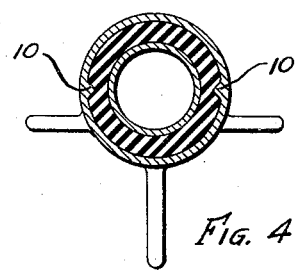
Fig. 4 is a section on the line 4—4 of Fig. 1.

In the preferred embodiment of my invention I employ a member 1 adapted for attachment to a trolley pole 2 by means of transverse rivets 3 or other suitable means. The member 1 may be of tubing or solid material preferably of steel tubing on account of its lightness. If of tubing one end is closed by means of a plug 4 or other means. Securely attached to the outer surface of the member 1 and enclosing the plugged end is a resilient insulating member 5 which forms an insulator against the current flowing from the collector support to the trolley pole and also prevents the vibrations set up between the trolley wire and the current collector passing to the trolley pole.

The member 5 is formed preferably of resilient or deformable rubber such as car spring rubber or the grade similar to that used in the manufacture of elastic rubber bands and has annular grooves 5' which hold cement later described and have other advantages. This covering 5 is preferably vulcanized to the surface of the member 1 and this may be brought about by roughening the outer surface of the member 1 and forming thereon a thin coating of hard rubber and then molding to this coating of hard rubber the elastic deformable coating 5 which will adhere to the thin coating of harder rubber. The coating of harder rubber will grip the surface of the member 1 very strongly.

Another method would be to plate a coating of rubber latex upon the surface of the member 1 and then applying a composition to form the member 5 upon the outer surface of the plated coating and then vulcanizing the coatings in the usual manner. The plated coating would have mixed therewith the proper ingredients for producing vulcanization thereof. Both methods outlined above for attaching vulcanized rubber to metal parts is well known in the rubber art.

The rubber covering 5 applied as above or by other improved methods clings very tenaciously to the surface of the member 1 and prevents relative rotation or movement in a longitudinal direction.

My invention further is provided with a base member 6 which has a tubular section 7 to receive a portion of the resilient covering 5. The member 7 is provided with a shoulder 8 and the member 5 is provided with a corresponding shoulder which prevents the base 6 from being removed after assembly. The members 1 and 5 are assembled with the member 6 by inserting the uncoated end of the member 1 into the enlarged end of the member 7 and until the shoulder 9 on the covering 5 engages with the shoulder 8. In assembling the said parts I apply to the surface of the rubber and portion 7 a rubber cement which permits the parts to slide together easily and after the cement has set resists relative movement of the parts 5 and 7 in a direction tending to separate the shoulders. Also the rubber portion is made a trifle larger than the passage in the member 7.

In order to prevent relative rotation of the base 6 with respect to the members 1 and 5 I provide longitudinal grooves 10 on the inner surface of the member 7 which are seated in longitudinal grooves on the surface of the enlarged portion of the member 5. Mounted upon the member 5 is a cup shaped collar 11 which encloses the end of the rubber 5 thus protecting it and holding it in place and the member 11 is held in place by resting against the end face of the trolley pole 2.

The free end of the body 6 is provided with a cup shaped portion 12 which has a vertical opening 13 to receive a bushing or collar 14. The portion 12 is provided with a groove formed with a side wall 15 and a bottom wall 16 which receives a ball race 17 upon which are mounted the balls 18 and held in place by the retainer 19. The ball-bearing composed of the parts 17, 18 and 19 is held in place through frictional engagement or pressure of the wall 15 of the member 12 and is supported by the wall 16. The member 12 is also provided with an external annular groove 20.

Mounted upon the member 12 is a turret 21 provided with an annular groove 22 which receives the member 19 of the ball bearing which rotates with the turret 21. The turret is provided with a downwardly extending annular flange 23 which projects into the groove 20 thus tending to prevent access from the outside to the interior of the member 12. The members 12 and 21 form a receptacle 24 in which is positioned grease or other lubricating material.

The turret is prevented from disassembling by means of the bolt 25 and the castellated nut 26. Member 21 is provided with a passage 27 which receives the bolt and registers with the passage through the collar 14. The lower end 28 of the turret is spaced from the adjacent portion of the member 12 and interposed between these parts and surrounding the bolt 25 is a spring contact member 29 which consists of a flat strip of phosphor bronze bent back upon itself and the legs having registering holes through which the bolt 25 passes. This contact spring forms a very efficient connection between the parts 21 and 12 whereby current is conducted from the part 21 to 12 thus preventing excess current through the ball-bearing and pitting of the balls. The adjustment of the bolt 25 with relation to its co-operating parts may be brought about through the castellated nut 26 and cotter pin 30.

The base 6 and the turret 21 are preferably made of aluminum for the sake of lightness and the bushing 14 is preferably of bronze metal. Mounted upon the member 21 is a current collector 31 which may be either of the rolling or sliding type. The collector is secured in position by means of a transverse pin 32 held in position by cotter pins 33 interlocked with the groove 34. Interposed between the side faces of the collector and the turret are contact springs 35 similar to the contact spring 29.

Integrally cast upon the base 6 is a socket portion 36 to receive a cable terminal 37 to which is secured a cable 38 which conducts the current from the trolley head directly to the distribution board in the bus thus rendering the pole 2 and its trolley base dead. The terminal 37 is held in position by means of set screw 39.

Modifications will suggest themselves to those skilled in the art based upon my disclosure herein, therefore, I wish to be limited only by my claims.

I claim:—

1. A trolley device comprising a support member having means to attach it to a pole, a body member positioned in overlapping relation to the support member, a turret member mounted upon the body member with a ball bearing interposed and a current collector mounted on the turret member; an elastic sleeve member closed at one end interposed between the support and body members and having a surface union with one member and the turret held in position by a pin about which the turret rotates and a spring contact member to conduct current from the turret directly to the base member.

2. A trolley device comprising a support member having means to attach it to a support, a sleeve member of deformable rubber and closed at one end positioned upon the support member and having a surface union therewith and a shoulder interposed between its ends, a body member having a tubular portion mounted upon the sleeve member out of contact with the support member and having a shoulder to engage the shoulder on the sleeve member to prevent relative movement of the sleeve and body in one longitudinal direction, means on the said tubular portion engaging means on the sleeve member to prevent relative rotation of the sleeve and body about their common longitudinal axis, a turret member mounted upon the body member to rotate about an axis angularly disposed to the said longitudinal axis, a stud about which the turret rotates and holding the turret and body members together, a ball-bearing interposed between the turret and body members, a spring contact device between the turret and body members to shunt current away from the ball-bearing and a current collecting member mounted on the turret and means to secure a conductor to the turret.

3. A trolley device comprising a support member having means to secure the support to a pole, a sleeve member of resilient rubber closed at one end positioned upon the support member at one end, a body member having a tubular portion to receive the sleeve and mounted upon the sleeve and having means to support a current collector, means on the body to engage means upon the sleeve to prevent relative longitudinal movement of the sleeve and body in one direction, and means on the sleeve engaging means on the body to prevent relative rotation of the body and sleeve in both directions about their longitudinal axis.

4. A trolley device comprising a support member having means to secure the support to a pole, a sleeve member of resilient rubber closed at one end positioned upon the support member at one end, a body member having a tubular portion to receive the sleeve and mounted upon and enclosing a portion of the sleeve and having means to support a current collector, means on the body to engage means upon the sleeve to prevent relative longitudinal movement of the sleeve and body in one direction, and means on the sleeve engaging means on the body to prevent relative rotation of the body and sleeve in both directions about their longitudinal axis.

5. A trolley device comprising a support member having means to secure the support to a pole, a sleeve member of resilient rubber closed at one end positioned upon the support member at one end, a body member having a tubular portion to receive the sleeve and mounted upon and enclosing a portion of the sleeve and having means to support a current collector, means on the body to engage means upon the sleeve to prevent relative longitudinal movement of the sleeve and body in one direction, and means on the sleeve engaging means on the body to prevent relative rotation of the body and sleeve in both directions about their longitudinal axis and a cup shaped collar to fit over the support member and enclose the exposed end of the sleeve.

6. A trolley device comprising a body member having a tubular portion to receive a support, an enlarged end having a receptacle, a ball-bearing mounted within the receptacle, a turret member mounted upon the ball-bearing and a pin holding the base and turret in position and about which the turret rotates, a spring contactor between the turret and the body and a current collecting member movably mounted upon the turret.

7. A trolley device comprising a body member having a tubular portion to receive a support, an enlarged end having a receptacle, a ball-bearing mounted within the receptacle, a turret member mounted upon the ball-bearing and a pin holding the base and turret in position and about which the turret rotates, an annular groove in a face of one of said members and a flange on the other member positioned within the groove, a spring contactor between the turret and the body and a current collecting member movably mounted upon the turret.

8. A trolley device comprising a body member having a tubular portion to receive a support, an enlarged end having a receptacle, a ball-bearing mounted within the receptacle, a turret member mounted upon the ball-bearing and a pin holding the base and turret in position and about which the turret rotates, means on one member to co-operate with means on the other member to prevent access to the receptacle, a spring contactor between the turret and the body and a current collecting member movably mounted upon the turret.

9. A trolley device comprising a body member having a tubular portion to receive a support, an enlarged end having a receptacle, a ball-bearing mounted within the receptacle, a turret member mounted upon the ball-bearing and a pin holding the base and turret in position and about which the turret rotates, means on the pin to adjust the relation of the turret relative to the ball-bearing, a spring contactor between the turret and the body and a current collecting member movably mounted upon the turret.

10. A trolley device comprising a body member of an aluminum alloy and having means to secure it to a support and means to receive a turret member of aluminum alloy, a ball-bearing positioned on the body member and upon which rests the turret, a pin of metal harder than the body and turret metal securing the members together in rotatable relation and a bushing of harder metal than that in the body and turret interposed between one member and the pin, spring means of high conductivity metal contacting with the body and turret members to conduct current and a current collector mounted on the turret and of a metal of a harder metal than that of the body and turret members.

11. A trolley device comprising a support member, a soft rubber sleeve mounted upon the support and extending along the support and secured to the same against rotation and longitudinal movement and having one portion of larger diameter than the other portion, a tubular member mounted upon the larger portion of the sleeve and provided with means preventing its removal in one longitudinal direction and means to prevent rotation relative to the sleeve and annular grooves in the enlarged portion of the sleeve.

12. A trolley device comprising a pair of tubular metal members in overlapping relation and out of direct contact, a sleeve of soft rubber interposed between the members to maintain them out of contact but permit relative yielding of the members, the sleeve having two portions of different diameters and one member enclosing the larger diameter portion of the sleeve and means preventing its removal therefrom in one direction and the smaller diameter portion of the sleeve extending along the other member beyond the end thereof, means preventing the displacement of the sleeve relative to one member and means preventing the rotation of the sleeve relative to the other member.

13. A trolley device comprising a pair of metallic members in telescopic relation and spaced from each other, a sleeve of soft rubber interposed between the members to hold them in spaced and fixed relation, the sleeve having a surface union with one member to prevent relative displacement thereof and having shouldered means to engage shouldered means on the other member to prevent displacement in one longitudinal direction and co-operating means on said sleeve and last mentioned member to prevent relative rotation of the sleeve and member.

14. A trolley device comprising a support member, a sleeve of soft vulcanized rubber extending along the support and secured thereto against rotation and longitudinal displacement, a tubular metallic member extending along the sleeve and secured thereto against relative rotation and longitudinal displacement, a current collecting device secured to the sleeve portion, the sleeve projecting beyond the tubular member at one end and enclosing one end of the support and means on the support member to attach the support member to a trolley pole.

In testimony whereof I affix my signature.

SAMUEL S. MATTHES.